(12) United States Patent
Izumi et al.

(10) Patent No.: US 10,478,925 B2
(45) Date of Patent: Nov. 19, 2019

(54) BRAZING FILLER MATERIAL AND BRAZING SHEET

(71) Applicant: Kobe Steel, Ltd., Kobe-shi (JP)

(72) Inventors: Takahiro Izumi, Moka (JP); Kenichiro Yoshida, Moka (JP); Akihiro Tsuruno, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/554,044

(22) PCT Filed: Feb. 23, 2016

(86) PCT No.: PCT/JP2016/055242
§ 371 (c)(1),
(2) Date: Aug. 28, 2017

(87) PCT Pub. No.: WO2016/152361
PCT Pub. Date: Sep. 29, 2016

(65) Prior Publication Data
US 2018/0021893 A1 Jan. 25, 2018

(30) Foreign Application Priority Data

Mar. 20, 2015 (JP) .................................. 2015-057121
Nov. 6, 2015 (JP) .................................. 2015-218752

(51) Int. Cl.
*B23K 35/00* (2006.01)
*B23K 35/28* (2006.01)
(Continued)

(52) U.S. Cl.
CPC ............ *B23K 35/282* (2013.01); *C22C 21/10* (2013.01); *F28F 21/084* (2013.01)

(58) Field of Classification Search
CPC ...... B23K 35/282; B23K 35/28; B23K 35/22; F28F 21/084; F28F 21/08; C22C 21/10; C22C 21/00; C22C 21/02
See application file for complete search history.

(56) References Cited

U.S. PATENT DOCUMENTS 3,136,632 A * 6/1964 Sprowl ................... C22C 21/02
420/544
3,306,717 A * 2/1967 Lindstrand ........... B23K 35/286
420/534
(Continued)

FOREIGN PATENT DOCUMENTS

CN 105296818 A * 2/2016 ............... C22C 1/02
GB 605282 A * 7/1948 ............. C22C 21/02
(Continued)

OTHER PUBLICATIONS

International Search Report dated May 24, 2016 in PCT/JP2016/055242, filed Feb. 23, 2016.
(Continued)

*Primary Examiner* — Kiley S Stoner
(74) *Attorney, Agent, or Firm* — Oblon, McClelland, Maier & Neustadt, L.L.P.

(57) ABSTRACT

The present invention provides a brazing filler material in which the formation of coarse Si particles is suppressed, and a brazing sheet using the same. The brazing filler material includes Si: 3.5% by mass or more and 13.0% by mass or less, Ti: 0.001% by mass or more and 0.05% by mass or less, V: more than 0.0005% by mass and 0.05% by mass or less, and B: 0.001% by mass or less (excluding 0% by mass), with the balance being Al and inevitable impurities, and the value of V/Ti, which is a value obtained by dividing the V content (% by mass) by the Ti content (% by mass) is 0.05 or more and 5 or less.

6 Claims, 2 Drawing Sheets

(51) Int. Cl.
*C22C 21/10* (2006.01)
*F28F 21/08* (2006.01)

(56) References Cited

U.S. PATENT DOCUMENTS

| | | | | |
|---|---|---|---|---|
| 3,788,824 A * | 1/1974 | Singleton, Jr. et al. | ..................... B23K 35/002 | 228/262.51 |
| 4,806,307 A * | 2/1989 | Hirose | ..................... C22C 21/00 | 420/528 |
| 4,975,243 A * | 12/1990 | Scott | ..................... C22C 21/02 | 148/438 |
| 5,055,255 A * | 10/1991 | Scott | ..................... C22C 21/02 | 148/438 |
| 5,162,065 A * | 11/1992 | Scott | ..................... C22C 21/02 | 148/438 |
| 5,460,895 A * | 10/1995 | Rungta | ..................... B23K 35/0238 | 165/905 |
| 7,514,155 B2 * | 4/2009 | Benedictus | ..................... B23K 35/0238 | 148/523 |
| 2002/0050511 A1 * | 5/2002 | Wittebrood | ..................... B23K 35/0238 | 228/247 |
| 2003/0051342 A1 | 3/2003 | Hasegawa et al. | | |
| 2003/0143102 A1 * | 7/2003 | Matsuoka | ..................... C22C 21/04 | 420/546 |
| 2006/0102696 A1 * | 5/2006 | Graham | ..................... B23K 35/002 | 228/101 |
| 2010/0266871 A1 | 10/2010 | Matsuo et al. | | |
| 2010/0296964 A1 * | 11/2010 | Oda | ..................... B22D 11/0605 | 420/535 |
| 2011/0111254 A1 * | 5/2011 | Wittebrood | ..................... B23K 35/002 | 428/654 |
| 2011/0198392 A1 * | 8/2011 | Wittebrood | ..................... B23K 35/0238 | 228/200 |
| 2011/0204124 A1 * | 8/2011 | Wittebrood | ..................... B23K 1/0012 | 228/219 |
| 2014/0234160 A1 * | 8/2014 | Mueller | ..................... C22C 21/02 | 420/544 |
| 2015/0315688 A1 * | 11/2015 | Doty | ..................... C22C 21/14 | 420/532 |
| 2017/0016093 A1 * | 1/2017 | Karlen | ..................... C22C 21/02 | |

FOREIGN PATENT DOCUMENTS

| | | | |
|---|---|---|---|
| JP | 2-061025 A | | 3/1990 |
| JP | 2-280992 A | | 11/1990 |
| JP | 03087329 A | * | 4/1991 |
| JP | 3-264189 A | | 11/1991 |
| JP | 2003-039194 A | | 2/2003 |
| JP | 2010-255012 A | | 11/2010 |
| JP | 2012-057183 A | | 3/2012 |
| JP | 2014-114475 A | | 6/2014 |
| WO | WO-2007131727 A1 * | 11/2007 | ........... B23K 35/286 |

OTHER PUBLICATIONS

Zhang, Q. et al., "Brazing and Soldering Manual", Second Edition, China Machine Press, 2008: pp. 51-52 and cover pages (with English Translation of a relevant part).

* cited by examiner

BRAZING FILLER MATERIAL AND BRAZING SHEET

TECHNICAL FIELD

The present invention relates to a 4000 series aluminum alloy brazing filler material that is used in brazing bond structures of automobile heat exchangers and the like, and an aluminum alloy brazing sheet including the brazing filler material.

BACKGROUND ART

Brazing sheets are conventionally used as material for heat exchangers of automobiles and the like, the brazing sheet being formed of an aluminum alloy (hereinafter sometimes simply referred to as the "Al alloy") as a core material, with a brazing filler material formed on one or both sides of the core material (hereinafter sometimes simply referred to as the "brazing sheet"). Brazing sheets each including a core material and a brazing filler material made of an Al—Si based alloy cladded on at least one side of the core material are used as each member, for example, tubes, header plates, side supports and the like of heat exchangers such as an inter cooler, a radiator, an oil cooler, a capacitor, a heater core, and an evaporator used in automobiles. After forming each of these brazing sheets into a predetermined shape, each member is bonded during a brazing step.

To prevent cracking during casting, namely, refining of crystal grains, it was common to add an Al—Ti—B based alloy in aluminum alloys. However, coarse Si particles are easily formed when Ti and B are added. A solidified structure of a 4000 series aluminum alloy brazing filler material is mainly composed of an Al—Si eutectic and an a solid solution, and crystallization of coarse Si particles having a maximum diameter of more than 20 μm may occur in the eutectic structure. The Si concentration and size of coarse Si particles do not significantly vary depending on the subsequent working and heat treatment. Therefore, it is known that formation of coarse Si particles causes significant melting around the coarse Si particles during heating for brazing, leading to formation of molten holes. Meanwhile, the formation of coarse Si particles was conventionally suppressed by a refining treatment of eutectic Si which is performed by adding Na, Sr and the like (see Patent Document 1). However, this technique was insufficient for suppression of the formation of coarse Si particles.

Therefore, Patent Document 1 discloses a brazing filler material of an aluminum brazing sheet for heat exchangers, which enables prevention or suppression of the formation of molten holes during heating for brazing by preventing crystallization of coarse Si particles or suppressing the growth of coarse Si particles; and a method for manufacturing the same.

PRIOR ART DOCUMENT

Patent Document

Patent Document 1: JP 2003-39194 A

DISCLOSURE OF THE INVENTION

Problems to be Solved by the Invention

In this way, to suppress the formation of coarse Si particles, various techniques are conventionally employed. However, it is required to develop the technique which realizes further suppression of the formation of coarse Si particles during melting and casting of an aluminum alloy.

The present invention has been made to solve the foregoing problems, and it is an object of the present invention to provide a brazing filler material in which the formation of coarse Si particles is suppressed, and a brazing sheet using the same.

Means for Solving the Problems

The inventors have found that the formation of coarse Si particles is suppressed by setting each content of elements in the range mentioned below: Ti: 0.001% by mass or more and 0.05% by mass or less, V: more than 0.0005% by mass and 0.05% by mass or less, and B: 0.001% by mass or less (excluding 0% by mass), and setting the value of V/Ti, which is a value obtained by dividing the V content (% by mass) by the Ti content (% by mass), in a range of 0.05 or more and 5 or less, in a 4000 series brazing filler material including Si: 3.5% by mass or more and 13.0% by mass or less.

Namely, the brazing filler material according to the present invention includes Si: 3.5% by mass or more and 13.0% by mass or less, Ti: 0.001% by mass or more and 0.05% by mass or less, V: more than 0.000% by mass and 0.05% by mass or less, and B: 0.001% by mass or less (excluding 0% by mass), with the balance being Al and inevitable impurities, and the value of V/Ti, which is a value obtained by dividing the V content (% by mass) by the Ti content (% by mass), is 0.05 or more and 5 or less.

With such an arrangement, the formation of coarse Si particles is suppressed during melting and casting of an aluminum alloy, thus obtaining a brazing filler material in which the formation of coarse Si particles is suppressed.

The brazing filler material according to the present invention preferably further includes one or more elements of Na: 0.0001% by mass or more and 0.01% by mass or less, and Sr: 0.001% by mass or more and 0.05% by mass or less.

With such an arrangement, eutectic Si is refined in the brazing filler material.

The brazing filler material according to the present invention preferably further includes Zn: 0.01% by mass or more and 6.0% by mass or less.

With such an arrangement, corrosion resistance of the brazing filler material side is improved in the brazing filler material.

The brazing filler material according to the present invention preferably further includes one or more elements Mn: 0.01% by mass or more and 1.2% by mass or less, and Fe: 0.3% by mass or more and 1.2% by mass or less. With such an arrangement, corrosion resistance of the brazing filler material side is improved in the brazing filler material.

The brazing sheet according to the present invention (hereinafter appropriately referred to as the brazing sheet) includes a core material and the above-mentioned brazing filler material cladded on at least one side of the core material.

With such an arrangement, the formation of molten holes is suppressed during heating for brazing in the brazing sheet.

Effects of the Invention

Regarding the brazing filler material of the present invention, the formation of coarse Si particles is suppressed, and thus the formation of molten holes is suppressed during heating for brazing.

Regarding the brazing sheet of the present invention, the formation of molten holes is suppressed during heating for brazing.

MODE FOR CARRYING OUT THE INVENTION

A brazing filler material and a brazing sheet for heat exchangers according to the present invention will be specifically described below.

<<Brazing Filler Material>>

The brazing filler material according to the present invention includes a predetermined amount of Si, Ti, V, and B, with the balance being Al and inevitable impurities, and the value of V/Ti is defined.

The brazing filler material may include, in addition to the components mentioned above, a predetermined amount of one or more elements of Na and Sr as an optional component. The brazing filler material may further include a predetermined amount of Zn as an optional component, and may include a predetermined amount of one or more elements of Mn and Fe as an optional component.

The reason for limiting each component will be described below. The content of each component is the content relative to the entire brazing filler material.

(Si: 3.5% by mass or more and 13.0% by mass or less)

When the Si content is less than 3.5% by mass, the amount of the brazing filler metal required for brazing is lacking, leading to defective brazing. Meanwhile, when the Si content exceeds 13.0% by mass, primary crystal Si is formed and grows up to coarse crystal. Therefore, the Si content is set at 3.5% by mass or more and 13.0% by mass or less.

In view of making brazing more satisfactory, the Si content is preferably 4.0% by mass or more, and more preferably 6.0% by mass or more. In view of further suppressing the formation of the primary crystal Si, the Si content is preferably 12.5% by mass or less, and more preferably 12.0% by mass or less.

(Ti: 0.001% by mass or more and 0.05% by mass or less)

To prevent casting cracking, the Ti content is set at 0.001% by mass or more. Meanwhile, when the Ti content exceeds 0.05% by mass, coarse Si crystals are easily formed. This mechanism has not been clarified yet, but is considered as follows. When the Ti content exceeds 0.05% by mass, $TiB_2$ is excessively formed and $TiB_2$ serves as nucleation sites of Si crystals, and thus coarse Si crystals are easily formed. Therefore, the Ti content is set at 0.001% by mass or more and 0.05% by mass or less. In view of further enhancing the effect of preventing casting cracking, the Ti content is preferably 0.005% by mass or more, and more preferably 0.01% by mass or more. In view of further suppressing the formation of coarse Si crystals, the Ti content is preferably 0.04% by mass or less, and more preferably 0.02% by mass or less.

(V: more than 0.0005% by mass and 0.05% by mass or less)

Although the mechanism is not clear, V is included in $TiB_2$, whereby, $TiB_2$ do not serve as nucleation sites of Si crystals, leading to suppression of the formation of coarse Si crystals. When the V content is 0.0005% by mass or less, the amount of V included in $TiB_2$ becomes very small and $TiB_2$ serve as nucleation sites of coarse Si crystals, and thus coarse Si crystals are easily formed. Meanwhile, when the V content exceeds 0.05% by mass, Al—V based compounds, Al—Ti—V(—B) based compounds and the like are formed and these compounds serve as nucleation sites of Si crystals, and thus coarse Si crystals are easily formed. Therefore, the V content is set at more than 0.0005% by mass and 0.05% by mass or less. In view of further suppressing the formation of coarse Si crystals, the V content is preferably 0.005% by mass or more, and more preferably more than 0.01% by mass. In view of further suppressing the formation of coarse Si crystals, the V content is preferably 0.04% by mass or less, and more preferably 0.03% by mass or less.

(B: 0.001% by mass or less (excluding 0% by mass))

When the content of B exceeds 0.001% by mass, coarse Si crystals are easily formed. This mechanism has not been clarified yet, but is considered as follows. When the B content exceeds 0.001% by mass, $TiB_2$ is excessively formed and $TiB_2$ serves as nucleation sites of Si crystals, and thus coarse Si crystals are easily formed. Therefore, the B content is set at 0.001% by mass or less. In view of further suppressing the formation of coarse Si crystals, the B content is preferably 0.0008% by mass or less, and more preferably 0.0005% by mass or less. Meanwhile, in view of further enhancing the effect of preventing casting cracking, the lower limit of the B content is preferably 0.00001% by mass.

(Na: 0.0001% by mass or more and 0.01% by mass or less)

Eutectic Si is refined by adding Na to a brazing filler material. When the Na content is less than 0.0001% by mass, the effect may not be sufficiently obtained. Meanwhile, when the Na content exceeds 0.01% by mass, fluidity of the brazing filler metal may decrease, tending to lead to insufficient formation of a fillet during heating for brazing. Therefore, when adding Na, the Na content is set at 0.0001% by mass or more and 0.01% by mass or less. In view of refining eutectic Si, the content of Na is preferably 0.0003% by mass or more, and more preferably 0.0005% by mass or more. In view of suppressing a decrease in fluidity of the brazing filler metal, the content of Na is preferably 0.008% by mass or less, and more preferably 0.005% by mass or less.

(Sr: 0.001% by mass or more and 0.05% by mass or less)

Eutectic Si is refined by adding Sr to a brazing filler material. When the Sr content is less than 0.001% by mass, the effect may not be sufficiently obtained. Meanwhile, when the Sr content exceeds 0.05% by mass, fluidity of the brazing filler metal may decrease, tending to lead to insufficient formation of a fillet during heating for brazing. Therefore, when adding Sr, the Sr content is set at 0.001% by mass or more and 0.05% by mass or less. In view of refining eutectic Si, the Sr content is preferably 0.002% by mass or more, and more preferably 0.003% by mass or more. In view of suppressing a decrease in fluidity of the brazing filler metal, the Sr content is preferably 0.047% by mass or less, and more preferably 0.045% by mass or less.

(Zn: 0.01% by mass or more and 6.0% by mass or less)

To enhance corrosion resistance of the brazing filler material side, Zn may be added. When the Zn content is less than 0.01% by mass, satisfactory corrosion resistance is not obtained. Meanwhile, when the Zn content exceeds 6.0% by mass, Zn is excessively concentrated on a surface of the brazing filler material to thereby increase a self-consumption rate, and thus the corrosion resistance is degraded. Therefore, when adding Zn, the Zn content is set at 0.01% by mass or more and 6.0% by mass or less. In view of decreasing the self-consumption rate, the Zn content is preferably 5.5% by mass or less, and more preferably 5.0% by mass or less.
(Mn: 0.01% by mass or more and 1.2% by mass or less)

To enhance corrosion resistance of the brazing filler material side, Mn may be added. Due to the addition of Mn, Al—Mn—Si based compounds and the like are formed and corrosion proceeds around the compounds. Therefore, corrosion is dispersed, leading to an improvement in corrosion resistance. When the Mn content is less than 0.01% by mass, satisfactory corrosion resistance is not obtained. Meanwhile, when the Mn content exceeds 1.2% by mass, coarse Al—Mn—Si based compounds and the like are easily formed during casting, and thus workability is degraded. Therefore, when adding Mn, the Mn content is set at 0.01% by mass or more and 1.2% by mass or less. In view of improving the workability, the Mn content is preferably 1.1% by mass or less, and more preferably 1.0% by mass or less.
(Fe: 0.3% by mass or more and 1.2% by mass or less)

To enhance corrosion resistance of the brazing filler material side, Fe may be added. Due to the addition of Fe, Al—Fe—Si based compounds and the like are formed and corrosion proceeds around the compounds. Therefore, corrosion is dispersed, leading to an improvement in corrosion resistance. When the Fe content is less than 0.3% by mass, satisfactory corrosion resistance is not obtained. Meanwhile, when the Fe content exceeds 1.2% by mass, coarse Al—Fe—Si based compounds and the like are easily formed during casting, and thus workability is degraded. Therefore, when adding Fe, the Fe content is set at 0.3% by mass or more and 1.2% by mass or less. In view of further improving the corrosion resistance, the Fe content is preferably 0.35% by mass or more, and more preferably 0.4% by mass or more. In view of further improving the workability, the Fe content is preferably 1.1% by mass or less, and more preferably 1.0% by mass or less.
(Balance: Al and Inevitable Impurities)

Balance of a brazing filler material is composed of Al and inevitable impurities. The brazing filler material may include, as inevitable impurities, Fe: less than 0.3% by mass, Mn: less than 0.01% by mass, Zn: less than 0.01% by mass, Cu: less than 0.05% by mass, P: less than 0.005% by mass and the like.
(Value of V/Ti: 0.05 or more and 5 or less)

When the value of V/Ti is less than 0.05, $TiB_2$ containing no V is easily formed and $TiB_2$ serves as nucleation sites of Si crystals, and thus coarse Si crystals are easily formed. Meanwhile, when the value of V/Ti exceeds 5, Al—V based compounds and the like are easily formed and Al—V based compounds serve as nucleation sites of Si crystals, and thus coarse Si crystals are easily formed. Therefore, the value of V/Ti is set at 0.05 or more and 5 or less. In view of further suppressing the formation of coarse Si crystals, the value of V/Ti is preferably 0.2 or more, and more preferably 0.7 or more. In view of further suppressing the formation of coarse Si crystals, the value of V/Ti is preferably 4 or less, and more preferably 3.5 or less.

The brazing filler material mentioned above of the present invention is a brazing filler material in which the formation of coarse Si particles is suppressed. As used herein, coarse Si particles mean those each having a circle equivalent diameter of 20 μm or more. For example, in case a measurement of Si particles is made by the following procedure, when most coarse Si particles have a circle equivalent diameter of less than 20 μm, it can be said that the amount of coarse Si particles included in the structure is suppressed.
[Method for Measurement of Maximum Si Particle Size]

Figure 1:
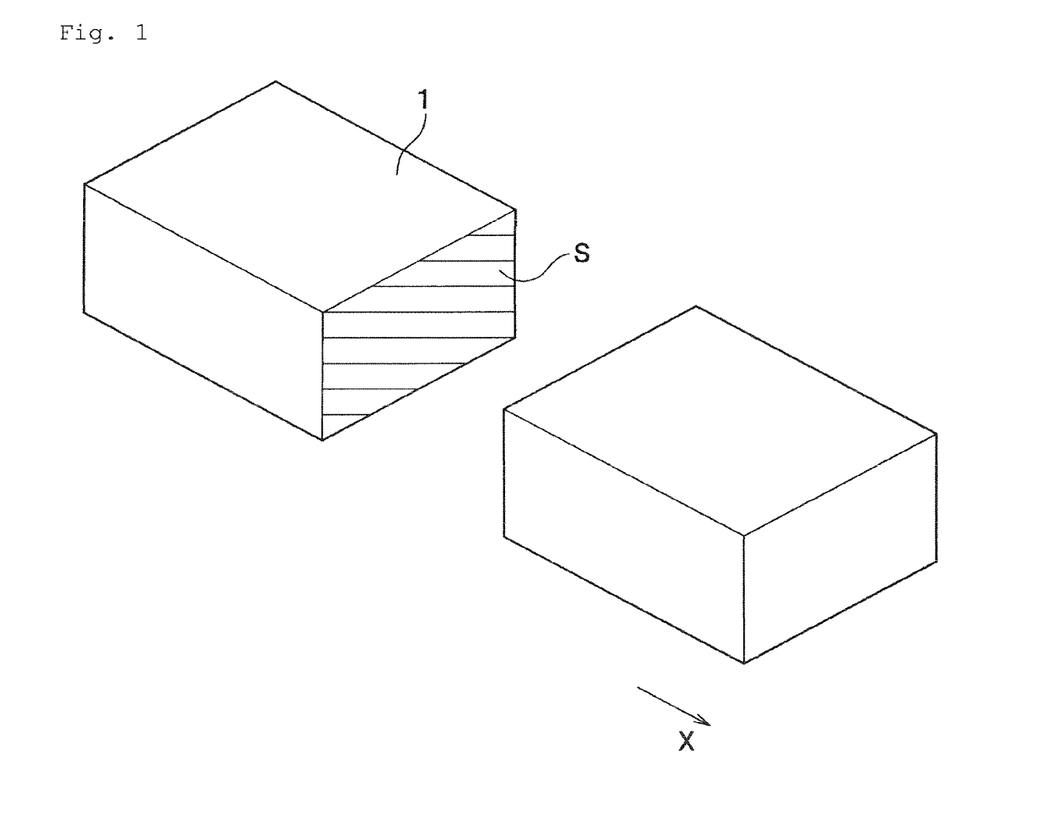
FIG. 1 is a schematic view for explaining a cross section of an ingot.
Figure 2:
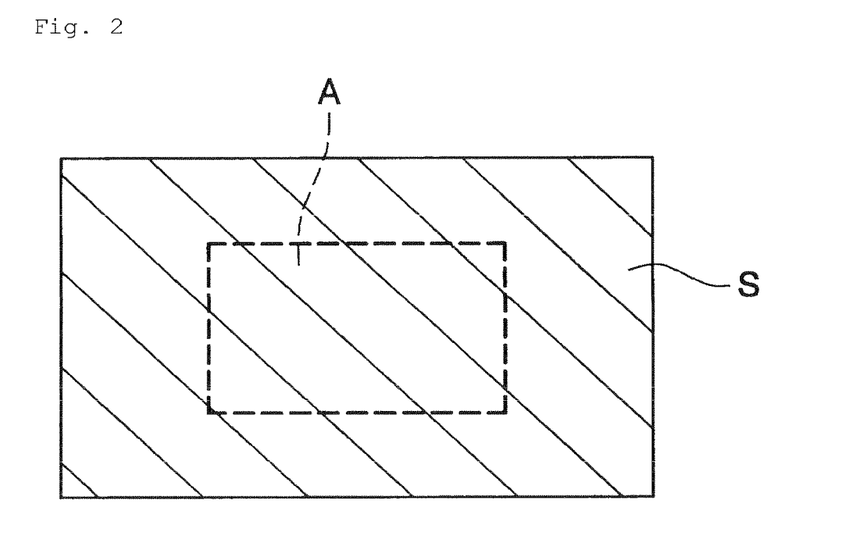
FIG. 2 is a schematic view for explaining the center of a cross section.

As shown in FIGS. 1 and 2, after vertically cutting at the center in a casting direction X of an ingot 1 (portion at half the length in the casting direction X) in a direction orthogonal to the casting direction X, mirror finishing of a region A as the center having a size of 50 mm (in a thickness direction (vertical direction))×70 mm (in a width direction (direction orthogonal to the casting direction X)) of a cross section S is performed by wet polishing. Then, a distribution state of Si particles of the entire region A is examined by an optical microscope etc. at a magnification of for example 100 times. Specifically, photographing of the entire region is performed by an optical microscope etc., and a circle equivalent diameter of Si particles is determined from binarized images by analysis software and then the size is discriminated. FIGS. 1 and 2 schematically show the ingot for easier understanding of the description, and the size etc. of its member and region shown in each drawing may be sometimes magnified.

<<Brazing Sheet>>

A brazing sheet according to the present invention is cladded the brazing filler material mentioned above on at least one side of a core material.

Examples of the brazing sheet include a three-layered brazing sheet including a brazing filler material formed on one side of a core material, and a sacrificial material formed on the other side of the core material, and a three-layered brazing sheet including a brazing filler material formed on both sides of the core material. The brazing sheet may be a four- or five-layered brazing sheet in which an intermediate material is formed between a core material and a brazing filler material, or formed between a core material and a sacrificial material. The brazing sheet may also be a six or more-layered brazing sheet in which the number of a sacrificial material, a brazing filler material, and an intermediate material is increased.

The core material used in the brazing sheet of the present invention is not particularly defined, and a conventionally known core material may be used. An aluminum alloy usable as the core material of the brazing sheet may be any of 2000 series, 3000 series, 5000 series, and 6000 series aluminum alloys. These aluminum alloys are sufficiently usable as an aluminum alloy brazing sheet to be used for applications such as automobile heat exchangers, in view of physical properties.

Specifically, it is possible to use, for example, an aluminum alloy including Si: 0.10 to 1.00% by mass, Cu: 0.50 to 1.20% by mass, and Mn: 0.50 to 2.00% by mass, with the balance being Al and inevitable impurities. If necessary, it is also possible to use an aluminum alloy further including at least one selected from Ti: 0.05 to 0.25% by mass, Cr: 0.05 to 0.25% by mass, and Mg: 0.05 to 0.50% by mass.

The sacrificial material used in the brazing sheet of the present invention is not particularly defined, and a conventionally known sacrificial material may be used. An aluminum alloy usable as the sacrificial material of the brazing sheet may be 7000 series aluminum alloys including Zn. The aluminum alloy may further include, Si, Mn and the like. It is possible to use, for example, an Al—Mg—Si—Zn alloy, an Al—Si—Mn—Zn based alloy, an Al—Mg—Zn based alloy and the like.

Specifically, it is possible to use, for example, an aluminum alloy including Si: more than 0.20% by mass and 0.80% by mass or less, Zn: more than 2.00% by mass and 5.00% by mass or less, and Mg: 1.00 to 4.50% by mass, with the balance being Al and inevitable impurities.

The intermediate material used in the brazing sheet of the present invention is not particularly defined, and a conventionally known intermediate material may be used. It is possible to suitably use, as an aluminum alloy used as the intermediate material of the brazing sheet, for example, an aluminum alloy including Si, Mn, Cu, Ti and the like added to improve the strength and to ensure a potential difference between the intermediate material and the brazing filler material, in addition to pure Al and JIS3003.

<<Method for Manufacturing Brazing Sheet>>

A method for manufacturing a brazing sheet of the present invention will be described below. The brazing sheet of the present invention can be manufactured by the following method as a typical example. Here, description is made on a method for manufacturing a three-layered brazing sheet including a brazing filler material formed on one side of a core material, and a sacrificial material formed on the other side of the core material.

First, an aluminum alloy for a core material, an aluminum alloy for a sacrificial material, and an aluminum alloy for a brazing filler material are melted and casted by a continuous casting method to thereby fabricate respective ingots. The ingots are subjected to face milling (surface planarization process) and homogeneous heat treatment to thereby fabricate a core-material ingot (core-material member), a sacrificial material ingot, and a brazing filler-material ingot. Thereafter, the sacrificial material ingot and the brazing filler-material ingot are hot-rolled into predetermined thicknesses to thereby fabricate a sacrificial material member and a brazing filler-material member, respectively. Regarding the brazing filler-material ingot, a cooling rate at the center of the ingot during casting is preferably set at 0.01° C./sec or more in a temperature range from 577° C. to 600° C.

Subsequently, the sacrificial material member is overlapped on one surface of the core-material member, and the brazing filler-material member is overlapped on the other surface of the core-material member. Such an overlapped member is subjected to a heat treatment (reheating), and then hot-rolled and pressure-bonded to thereby fabricate plate-shaped materials. Thereafter, these plate-shaped materials are subjected to cold-rolling, and if necessary, intermediate annealing, and further finish cold-rolling. These plate-shaped materials may be subjected to final annealing after finish cold-rolling. In addition, these plate-shaped materials may be subjected to final annealing after rolling without performing intermediate annealing and finish cold-rolling.

Note that the core-material ingot may not be subjected to the homogeneous heat treatment. The brazing filler-material ingot and the sacrificial material ingot may have their thicknesses adjusted by face milling without being hot-rolled to thereby fabricate the brazing filler-material member and the sacrificial material member. Alternatively, the overlapped member may not be subjected to a heat treatment.

Conditions for the casting, the homogeneous heat treatment, the reheating, the hot-rolling, the cold-rolling, the intermediate annealing, the finish cold-rolling, and the final annealing on the respective materials mentioned above can be set in accordance with the well-known standard methods.

The core-material member, the sacrificial material member, and the brat material member are those before processing into the brazing sheet, and are therefore referred to as a core-material member, a sacrificial material member, and a brazing filler-material member. These members may also be referred to as a core material, a sacrificial material, and a brazing filler material. In the present invention, the brazing filler-material member is referred to as a brazing filler material.

The brazing filler material of the present invention, and the brazing sheet using the same can be widely used for various applications such as tubes, header plates, side supports and the like of heat exchangers such as an inter cooler, a radiator, an oil cooler, a capacitor, a heater core, and an evaporator used in automobiles.

To use for these applications, there is generally a need to process into a brazing bond structure using the brazing sheet including the brazing filler material.

An example of a method for manufacturing a brazing bond structure will be described below. Heat exchangers such as a capacitor, an evaporator, and an intercooler, mounted on automobiles are generally provided with an assembled structure by combining flat tubes forming fluid flow passages and fins made by corrugating plates to allow the tubes and fins to be overlapped alternately and repeatedly, using the brazing sheet of the present invention, and fitting the tubes into plates (headers) produced by press-forming plate materials so as to collect the fluid passages.

These parts are heated for brazing while being assembled, whereby bonding is formed between the tubes and the fins, and between the tubes and the plates to thereby fabricate a heat exchanger. The brazing filler material (molten brazing filler material) melted by heating for brazing fills in connection parts between the parts to form a wax reservoir (fillet) to thereby bond these parts forming the structure.

It is possible to apply a brazing sheet including a core material made of an aluminum alloy and the brazing filler material of the present invention cladded on at least one side of the core material to at least one of such tubes, plates, and fins.

EXAMPLES

The brazing filler material and the brazing sheet of the present invention will be specifically described below by comparing Examples satisfying the requirements of the present invention with Comparative Examples not satisfying the requirements of the present invention.

An Al—Si based alloy including elements shown in Table 1 supposed to be a brazing filler material (in some cases, a brazing filler material imparted with corrosion resistance) was melted and casted by DC casting to thereby fabricate an ingot. A maximum. Si particle size of this ingot was measured. The ingot had a size of 150 mm in thickness×350 mm in width×1,000 mm in length. A cooling rate at the center of this ingot during casting was about 0.5° C./sec in a temperature range from 577° C. to 600° C.

[Method for Measurement of Maximum Si Particle Size]

After vertically cutting at the center in a casting direction of an ingot (portion at half the length in the casting direction) in a direction orthogonal to the casting direction, mirror finishing of a region as the center having a size of 50 mm (in a thickness direction)×70 mm (in a width direction) of a cross section was performed by wet polishing. Then, a distribution state of Si particles of the entire region of the region described above was examined by an optical microscope at a magnification of 100 times. Specifically, photographing of the entire region was performed by an optical microscope, and a circle equivalent diameter of Si particles was determined from binarized images by analysis software (Image-Pro, PLUS, Media Cybernetics, Inc., Version. 6.0) and then the size was discriminated. Most coarse Si particle having a circle equivalent diameter of less than 10 μm were rated as "A", most coarse Si particles having a circle equivalent diameter of 10 μm or more and less than 15 μm were rated as "B", most coarse Si particles having a circle equivalent diameter of 15 μm or more and less than 20 μm were rated as "C", and most coarse Si particles having a circle equivalent diameter of 20 µm or more were rated as "D". Si particles rated as "A", "B", and "C" were evaluated as "Pass".

After ingot-making of an alloy for core material as an Al—Mn—Si based alloy was performed by DC casting, the ingot thus obtained was subjected to double-sided milling to obtain a core-material ingot having a desired thickness. A brazing filler-material ingot was cut out from a region as the center having a size of 50 mm (in a thickness direction)×70 mm (in a width direction) of a vertical cross section in a direction orthogonal to the casting direction. After subjecting to a homogenization treatment respectively, the brazing filler-material ingot and the core-material ingot were combined to obtain an overlapped member, which was subjected to hot-rolling, cold-rolling, and annealing, thus obtaining a sample material having a thickness of 0.2 mm. A clad rate of the brazing filler material was set at 10%.

When stripes are recognized on a surface of the thus fabricated brazing filler-material ingot by visual observation, a cross section of the ingot at the position was observed and the depth of cracking was measured. Cracking having a maximum length of 20 mm or more was defined as casting cracking.

The thus fabricated sample material was cut into pieces each having a size of 0.2 mm in thickness×50 mm in width×200 mm in length, followed by heating corresponding to brazing at 600° C. for 3 minutes. Thereafter, after cutting into pieces each having a size of 20 mm in width, 25 plates each having a size of 0.2 mm in thickness×20 mm in width were prepared and these plates were overlapped on each other. After polishing and etching with Keller's solution of a region in which a cross-sectional area of a vertical cross section of the sample material at the center in a rolling direction (portion at half the length in the rolling direction) in a direction orthogonal to the rolling direction is 100 mm² (0.2 mm in thickness×20 mm in width×25 plates), the entire region of the region was observed at a magnification of 100 times by an optical microscope. The thickness of the unmolten portion of the core material (length in a thickness direction) was measured at a place where erosion of the core material occurs most drastically due to the molten brazing filler metal, Sample material in which the thickness of the unmolten portion of the core material is 100 µm or more was evaluated as "pass".

The amounts of elements and the evaluation results are shown in Tables 1 and 2. Note that in Table 1, sample materials including no element were denoted as "–". Numerical values not satisfying the requirements of the present invention are underlined.

TABLE 1

| | | | | | Amount of element (% by mass) (balance: Al) | | | | | | | |
|---|---|---|---|---|---|---|---|---|---|---|---|---|
| No. | Si | Ti | B | V | Na | Sr | Zn | Mn | Fe | Cu | P | Amount of other impurities |
| 1 | 10.0 | 0.05 | 0.0008 | 0.005 | — | — | 0.0007 | 0.002 | 0.005 | 0.0002 | 0.0003 | 0.01 |
| 2 | 10.0 | 0.005 | 0.0008 | 0.005 | — | — | 0.001 | 0.006 | 0.17 | 0.001 | 0.001 | 0.02 |
| 3 | 10.0 | 0.01 | 0.0008 | 0.0006 | — | — | 0.0002 | 0.0015 | 0.004 | 0.0002 | 0.0003 | 0.01 |
| 4 | 10.0 | 0.01 | 0.0008 | 0.05 | — | — | 0.0001 | 0.001 | 0.003 | 0.0001 | 0.0001 | 0.01 |
| 5 | 10.0 | 0.01 | 0.0008 | 0.0055 | — | — | 0.001 | 0.007 | 0.17 | 0.001 | 0.001 | 0.02 |
| 6 | 10.0 | 0.01 | 0.0008 | 0.04 | — | — | 0.001 | 0.008 | 0.15 | 0.001 | 0.0009 | 0.02 |
| 7 | 10.0 | 0.01 | 0.0008 | 0.0105 | — | — | 0.02 | 0.02 | 0.27 | 0.02 | 0.001 | 0.03 |
| 8 | 10.0 | 0.01 | 0.0008 | 0.03 | — | — | 0.03 | 0.015 | 0.25 | 0.01 | 0.0009 | 0.03 |
| 9 | 10.0 | 0.01 | 0.001 | 0.005 | — | — | 0.0007 | 0.003 | 0.005 | 0.0002 | 0.0003 | 0.01 |
| 10 | 10.0 | 0.01 | 0.0005 | 0.005 | — | — | 0.001 | 0.006 | 0.17 | 0.001 | 0.001 | 0.02 |
| 11 | 10.0 | 0.05 | 0.0008 | 0.005 | 0.003 | — | 0.009 | 0.007 | 0.1 | 0.006 | 0.001 | 0.02 |
| 12 | 10.0 | 0.05 | 0.0008 | 0.005 | 0.0001 | — | 0.0005 | 0.002 | 0.006 | 0.0003 | 0.0005 | 0.01 |
| 13 | 10.0 | 0.05 | 0.0008 | 0.005 | 0.01 | — | 0.015 | 0.025 | 0.2 | 0.02 | 0.002 | 0.03 |
| 14 | 10.0 | 0.05 | 0.0008 | 0.005 | — | 0.015 | 0.007 | 0.005 | 0.09 | 0.002 | 0.003 | 0.02 |
| 15 | 10.0 | 0.05 | 0.0008 | 0.005 | — | 0.001 | 0.0007 | 0.0005 | 0.005 | 0.0002 | 0.001 | 0.01 |
| 16 | 10.0 | 0.05 | 0.0008 | 0.005 | — | 0.05 | 0.01 | 0.03 | 0.18 | 0.03 | 0.001 | 0.03 |
| 17 | 10.0 | 0.05 | 0.0008 | 0.005 | — | — | 3.0 | 0.002 | 0.008 | 0.0005 | 0.0002 | 0.01 |
| 18 | 10.0 | 0.05 | 0.0008 | 0.005 | 0.003 | — | 3.0 | 0.001 | 0.005 | 0.0002 | 0.0008 | 0.01 |
| 19 | 10.0 | 0.05 | 0.0008 | 0.005 | — | 0.015 | 3.0 | 0.0015 | 0.005 | 0.0002 | 0.0009 | 0.01 |
| 20 | 4.0 | 0.05 | 0.0008 | 0.005 | — | — | 0.0007 | 0.0005 | 0.006 | 0.0003 | 0.0004 | 0.01 |
| 21 | 12.0 | 0.05 | 0.0008 | 0.005 | — | — | 0.0007 | 0.001 | 0.004 | 0.0002 | 0.0002 | 0.01 |
| 22 | 10.0 | 0.05 | 0.0008 | 0.005 | 0.001 | 0.009 | 0.0007 | 0.003 | 0.009 | 0.0001 | 0.0001 | 0.01 |
| 23 | 10.0 | 0.05 | 0.0008 | 0.005 | — | — | 0.0007 | 0.8 | 0.005 | 0.0002 | 0.0003 | 0.01 |
| 24 | 10.0 | 0.05 | 0.0008 | 0.005 | — | — | 0.0007 | 0.0025 | 0.7 | 0.0005 | 0.0004 | 0.01 |
| 25 | 10.0 | 0.05 | 0.0008 | 0.005 | — | — | 3.0 | 0.8 | 0.002 | 0.0002 | 0.0005 | 0.01 |
| 26 | 10.0 | 0.05 | 0.0008 | 0.005 | — | — | 3.0 | 0.0015 | 0.7 | 0.0009 | 0.0006 | 0.01 |
| 27 | 10.0 | 0.05 | 0.0008 | 0.005 | 0.003 | — | 3.0 | 0.8 | 0.001 | 0.0002 | 0.0003 | 0.01 |
| 28 | 10.0 | 0.05 | 0.0008 | 0.005 | — | 0.015 | 3.0 | 0.8 | 0.005 | 0.0004 | 0.0002 | 0.01 |
| 29 | 10.0 | 0.05 | 0.0008 | 0.005 | 0.003 | — | 3.0 | 0.001 | 0.7 | 0.0002 | 0.0001 | 0.01 |
| 30 | 10.0 | 0.05 | 0.0008 | 0.005 | — | 0.015 | 3.0 | 0.002 | 0.7 | 0.0001 | 0.0003 | 0.01 |
| 31 | 10.0 | 0.05 | 0.0008 | 0.005 | — | — | 3.0 | 0.8 | 0.7 | 0.0005 | 0.0005 | 0.01 |
| 32 | 10.0 | 0.05 | 0.0008 | 0.005 | 0.003 | — | 3.0 | 0.8 | 0.7 | 0.0006 | 0.0006 | 0.01 |
| 33 | 10.0 | 0.05 | 0.0008 | 0.005 | — | 0.015 | 3.0 | 0.8 | 0.7 | 0.0002 | 0.0008 | 0.01 |
| 34 | 10.0 | 0.05 | 0.0008 | 0.005 | 0.001 | 0.009 | 3.0 | 0.8 | 0.7 | 0.0002 | 0.0008 | 0.01 |
| 35 | 10.0 | 0.05 | 0.0008 | 0.005 | — | — | 0.06 | 0.002 | 0.002 | 0.0002 | 0.0005 | 0.01 |
| 36 | 10.0 | 0.05 | 0.0008 | 0.005 | — | — | 6.0 | 0.003 | 0.003 | 0.0001 | 0.0004 | 0.01 |
| 37 | 10.0 | 0.05 | 0.0008 | 0.005 | — | — | 0.0005 | 0.06 | 0.004 | 0.0003 | 0.0003 | 0.01 |
| 38 | 10.0 | 0.05 | 0.0008 | 0.005 | — | — | 0.0003 | 1.2 | 0.002 | 0.0001 | 0.0005 | 0.01 |
| 39 | 10.0 | 0.05 | 0.0008 | 0.005 | — | — | 0.0001 | 0.001 | 0.31 | 0.0005 | 0.0006 | 0.01 |
| 40 | 10.0 | 0.05 | 0.0008 | 0.005 | — | — | 0.0005 | 0.002 | 1.2 | 0.0003 | 0.0009 | 0.01 |
| 41 | 10.0 | 0.06 | 0.0005 | 0.005 | — | — | 0.001 | 0.0015 | 0.008 | 0.0005 | 0.0006 | 0.01 |
| 42 | 10.0 | 0.01 | 0.002 | 0.005 | — | — | 0.001 | 0.002 | 0.007 | 0.001 | 0.0002 | 0.01 |
| 43 | 10.0 | 0.01 | 0.0008 | 0.0004 | — | — | 0.0005 | 0.003 | 0.009 | 0.0006 | 0.0003 | 0.01 |
| 44 | 10.0 | 0.01 | 0.0008 | 0.06 | — | — | 0.0007 | 0.0035 | 0.005 | 0.0002 | 0.0005 | 0.01 |

TABLE 1-continued

| No. | Si | Ti | B | V | Na | Sr | Zn | Mn | Fe | Cu | P | Amount of other impurities |
|---|---|---|---|---|---|---|---|---|---|---|---|---|
| 45 | 10.0 | 0.06 | 0.0008 | 0.005 | 0.003 | — | 0.0009 | 0.0045 | 0.004 | 0.0003 | 0.0006 | 0.01 |
| 46 | 10.0 | 0.01 | 0.002 | 0.005 | 0.003 | — | 0.0003 | 0.003 | 0.005 | 0.0002 | 0.0007 | 0.01 |
| 47 | 10.0 | 0.01 | 0.0008 | 0.0004 | 0.003 | — | 0.0006 | 0.0025 | 0.003 | 0.0001 | 0.0003 | 0.01 |
| 48 | 10.0 | 0.01 | 0.0008 | 0.06 | 0.003 | — | 0.0004 | 0.0005 | 0.008 | 0.0005 | 0.0001 | 0.01 |
| 49 | 10.0 | 0.06 | 0.0008 | 0.005 | — | 0.015 | 0.0008 | 0.001 | 0.009 | 0.0007 | 0.0003 | 0.01 |
| 50 | 10.0 | 0.01 | 0.002 | 0.005 | — | 0.015 | 0.0003 | 0.0015 | 0.006 | 0.0008 | 0.0008 | 0.01 |
| 51 | 10.0 | 0.01 | 0.0008 | 0.0004 | — | 0.015 | 0.0007 | 0.002 | 0.007 | 0.0001 | 0.0009 | 0.01 |
| 52 | 10.0 | 0.01 | 0.0008 | 0.06 | — | 0.015 | 0.0009 | 0.0025 | 0.005 | 0.0002 | 0.0003 | 0.01 |
| 53 | 14.0 | 0.05 | 0.0008 | 0.005 | — | — | 0.0007 | 0.001 | 0.004 | 0.0004 | 0.0002 | 0.01 |
| 54 | 10.0 | 0.0005 | 0.0008 | 0.005 | — | — | 0.001 | 0.006 | 0.17 | 0.001 | 0.001 | 0.02 |
| 55 | 10.0 | 0.05 | 0.0008 | 0.001 | — | — | 0.02 | 0.02 | 0.27 | 0.02 | 0.001 | 0.03 |
| 56 | 10.0 | 0.009 | 0.0008 | 0.05 | — | — | 0.02 | 0.02 | 0.27 | 0.02 | 0.001 | 0.03 |

TABLE 2

| No. | Value of V/Ti | Maximum Si particle size | Thickness of unmolten portion of core material after heating corresponding to brazing (μm) | Note |
|---|---|---|---|---|
| 1 | 0.1 | C | 120 | |
| 2 | 1 | B | 140 | |
| 3 | 0.06 | C | 120 | |
| 4 | 5 | C | 120 | |
| 5 | 0.55 | B | 140 | |
| 6 | 4 | B | 140 | |
| 7 | 1.05 | A | 170 | |
| 8 | 3 | A | 170 | |
| 9 | 0.5 | C | 120 | |
| 10 | 0.5 | B | 140 | |
| 11 | 0.1 | B | 140 | |
| 12 | 0.1 | B | 140 | |
| 13 | 0.1 | B | 140 | |
| 14 | 0.1 | B | 140 | |
| 15 | 0.1 | B | 140 | |
| 16 | 0.1 | B | 140 | |
| 17 | 0.1 | C | 120 | |
| 18 | 0.1 | B | 140 | |
| 19 | 0.1 | B | 140 | |
| 20 | 0.1 | C | 120 | |
| 21 | 0.1 | C | 120 | |
| 22 | 0.1 | B | 140 | |
| 23 | 0.1 | C | 120 | |
| 24 | 0.1 | C | 120 | |
| 25 | 0.1 | C | 120 | |
| 26 | 0.1 | C | 120 | |
| 27 | 0.1 | B | 140 | |
| 28 | 0.1 | B | 140 | |
| 29 | 0.1 | B | 140 | |
| 30 | 0.1 | B | 140 | |
| 31 | 0.1 | C | 120 | |
| 32 | 0.1 | B | 140 | |
| 33 | 0.1 | B | 140 | |
| 34 | 0.1 | B | 140 | |
| 35 | 0.1 | C | 120 | |
| 36 | 0.1 | C | 120 | |
| 37 | 0.1 | C | 120 | |
| 38 | 0.1 | C | 120 | |
| 39 | 0.1 | C | 120 | |
| 40 | 0.1 | C | 120 | |
| 41 | 0.08 | D | 50 | |
| 42 | 0.5 | D | 30 | |
| 43 | 0.04 | D | 40 | |
| 44 | 6 | D | 60 | |
| 45 | 0.08 | D | 40 | |
| 46 | 0.5 | D | 30 | |
| 47 | 0.04 | D | 10 | |
| 48 | 6 | D | 30 | |
| 49 | 0.08 | D | 20 | |
| 50 | 0.5 | D | 50 | |
| 51 | 0.04 | D | 60 | |
| 52 | 6 | D | 70 | |
| 53 | 0.1 | D | 10 | |
| 54 | 10 | — | — | Casting cracking |
| 55 | 0.02 | D | 10 | |
| 56 | 6 | D | 30 | |

As shown in Tables 1 and 2, sample materials Nos. 1 to 40 as Examples satisfy the features of the present invention, and thus the maximum Si particle size and the thickness of the unmolten portion of the core material were evaluated as "pass"

Meanwhile, sample materials Nos. 41 to 56 as Comparative Examples do not satisfy the features of the present invention and thus had the following results.

Sample material No. 41 has a high Ti content, and thus Si particles underwent coarsening. Therefore, the thickness of the unmolten portion of the core materials was evaluated as "fail".

Sample material No. 42 has a high B content, and thus Si particles underwent coarsening. Therefore, the thickness of the unmolten portion of the core materials was evaluated as "fail".

Sample material No. 43 has a low V content and has a low value of V/Ti, and thus Si particles underwent coarsening. Therefore, the thickness of the unmolten portion of the core materials was evaluated as "fail".

Sample material No. 44 has a high V content and has a high value of V/Ti, and thus Si particles underwent coarsening. Therefore, the thickness of the unmolten portion of the core materials was evaluated as "fail".

Sample material No. 45 has a high Ti content, and thus Si particles underwent coarsening. Therefore, the thickness of the unmolten portion of the core materials was evaluated as "fail".

Sample material No. 46 has a high B content, and thus Si particles underwent coarsening. Therefore, the thickness of the unmolten portion of the core materials was evaluated as "fail".

Sample material No. 47 has a low V content and has a low value of V/Ti, and thus Si particles underwent coarsening.

Therefore, the thickness of the unmolten portion of the core materials was evaluated as "fail".

Sample material No. 48 has a high V content and has a high value of V/Ti, and thus Si particles underwent coarsening. Therefore, the thickness of the unmolten portion of the core materials was evaluated as "fail".

Sample material No. 49 has a high Ti content, and thus Si particles underwent coarsening. Therefore, the thickness of the unmolten portion of the core materials was evaluated as "fail".

Sample material No. 50 has a high B content, and thus Si particles underwent coarsening. Therefore, the thickness of the unmolten portion of the core materials was evaluated as "fail".

Sample material No. 51 has a low V content and has a low value of V/Ti, and thus Si particles underwent coarsening. Therefore, the thickness of the unmolten portion of the core materials was evaluated as "fail".

Sample material No. 52 has a high V content and has a high value of V/Ti, and thus Si particles underwent coarsening. Therefore, the thickness of the unmolten portion of the core materials was evaluated as "fail".

Sample material No. 53 has a high Si content, and thus Si particles underwent coarsening. Therefore, the thickness of the unmolten portion of the core materials was evaluated as "fail".

Sample material No. 54 has a low Ti content, and thus casting cracking occurred.

Sample material No. 55 has a low value of V/Ti, and thus Si particles underwent coarsening. Therefore, the thickness of the unmolten portion of the core materials was evaluated as "fail".

Sample material No. 56 high value of V/Ti, and thus Si particles underwent coarsening. Therefore, the thickness of the unmolten portion of the core materials was evaluated as "fail".

While the present invention has been described in detail by way of embodiments and Examples, spirit of the present invention is not limited to contents set forth hereinabove and the scope of rights thereof should be interpreted based on the description of the scope of claims. It goes without saying that the contents of the present invention can be modified and changed based on the description set forth hereinabove.

The present invention includes the following aspects.

First Aspect:

A brazing filler material including Si: 3.5% by mass or more and 13.0% by mass or less, Ti: 0.001% by mass or more and 0.05% by mass or less, V: more than 0.0005% by mass and 0.05% by mass or less, and B: 0.001% by mass or less (excluding 0% by mass), with the balance being Al and inevitable impurities, wherein the value of V/Ti, which is a value obtained by dividing the V content (% by mass) by the Ti content (% by mass) is 0.05 or more and 5 or less.

Second Aspect:

The brazing filler material according to the first aspect, further including one or more elements of Na: 0.0001% by mass or more and 0.01% by mass or less, and Sr: 0.001% by mass or more and 0.05% by mass or less.

Third Aspect:

The brazing filler material according to the first or second aspect, further including Zn: 0.01% by mass or more and 6.0% by mass or less.

Fourth Aspect:

The brazing filler material according to any one of the first to third aspects, further including one or more elements of Mn: 0.01% by mass or more and 1.2% by mass or less, and Fe: 0.3% by mass or more and 1.2% by mass or less.

Fifth Aspect:

A brazing sheet for heat exchangers, wherein the brazing filler material according to any one of the first to fourth aspects is cladded on at least one side of a core material.

This application claims priority based on Japanese Patent Application 2015-057121 filed on Mar. 20, 2015 and Japanese Patent Application 2015-218752 filed on Nov. 6, 2015, the disclosure of which is incorporated by reference herein.

DESCRIPTION OF REFERENCE NUMERALS

1: Ingot
A: Region of center of ingot
S: Cross section
X: Casting direction

The invention claimed is:

1. A brazing filler material, consisting of:
Si: 3.5% by mass or more and 13.0% by mass or less,
Ti: 0.001% by mass or more and 0.05% by mass or less,
V: more than 0.0005% by mass and 0.05% by mass or less,
Fe: 0.15% by mass or more and 1.2% by mass or less,
Cu: less than 0.05% by mass,
B: 0.001% by mass or less, excluding 0% by mass,
with the balance being Al and inevitable impurities,
wherein a value of V/Ti, which is a value obtained by dividing a V content (% by mass) by a Ti content (% by mass), is 0.05 or more and 5 or less.

2. A brazing filler material, consisting of:
Si: 3.5% by mass or more and 13.0% by mass or less,
Ti: 0.001% by mass or more and 0.05% by mass or less,
V: more than 0.0005% by mass and 0.05% by mass or less,
Fe: 0.15% by mass or more and 1.2% by mass or less,
Cu: less than 0.05% by mass,
B: 0.001% by mass or less, excluding 0% by mass,
one or more element selected from the group consisting of
Zn: 0.01% by mass or more and 6.0% by mass or less, and Mn: 0.01% by mass or more and 1.2% by mass or less,
with the balance being Al and inevitable imprities,
wherein a value of V/Ti, which is a value obtained by dividing a V content (% by mass) by a Ti content (% by mass), is 0.05 or more and 5 or less.

3. A brazing sheet, wherein the brazing filler material according to claim 1 is cladded on at least one side of a core material.

4. A brazing sheet, wherein the brazing filler material according to claim 2 is cladded on at least one side of a core material.

5. A brazing filler material, consisting of:
Si: 3.5% by mass or more and 13.0% by mass or less,
Ti: 0.001% by mass or more and 0.05% by mass or less,
V: more than 0.0005% by mass and 0.05% by mass or less,
Fe: 0.15% by mass or more and 1.2% by mass or less,
Cu: less than 0.05% by mass,
B: 0.001% by mass or less, excluding 0% by mass, and
one or more element selected from the group consisting of
Zn: 0.01% by mass or more and 6.0% by mass or less,
Mn: 0.01% by mass or more and 1.2% by mass or less,
Na: 0.0001% by mass or more and 0.01% by mass or less, and Sr: 0.001% by mass or more and 0.05% by mass or less,
with the balance being Al and inevitable impurities, wherein a value of V/Ti, which is a value obtained by dividing a V content (% by mass) by a Ti content (% by mass), is 0.05 or more and 5 or less.

6. A brazing sheet, wherein the brazing filler material according to claim 5 is cladded on at least one side of a core material.

* * * * *